June 11, 1963 F. T. PISANO ET AL 3,093,353

AIRCRAFT OCCUPANT PROTECTING AND EJECTING SYSTEM

Filed Jan. 28, 1963 4 Sheets-Sheet 1

INVENTORS
FRANK T. PISANO
LENNORD L. PITNEY

BY

S. J. Rotondi, A. T. Dupont & S. Dubroff

ATTORNEYS.

AIRCRAFT OCCUPANT PROTECTING AND EJECTING SYSTEM

Filed Jan. 28, 1963 4 Sheets-Sheet 2

INVENTORS.
FRANK T. PISANO
LENNORD L. PITNEY
BY
S. J. Rotondi, A. J. Dupont & S. Dubroff
ATTORNEYS.

June 11, 1963 F. T. PISANO ET AL 3,093,353

AIRCRAFT OCCUPANT PROTECTING AND EJECTING SYSTEM

Filed Jan. 28, 1963 4 Sheets-Sheet 3

INVENTORS.
FRANK T. PISANO
LENNORD L. PITNEY
BY
S. J. Rotondi, A. J. Dupont & S. Dubroff
ATTORNEYS.

June 11, 1963 F. T. PISANO ET AL 3,093,353

AIRCRAFT OCCUPANT PROTECTING AND EJECTING SYSTEM

Filed Jan. 28, 1963 4 Sheets-Sheet 4

INVENTORS.
FRANK T. PISANO
LENNORD L. PITNEY
BY
S. J. Rotondi, A. J. Dupont & S. Dubroff
ATTORNEYS.

United States Patent Office 3,093,353
Patented June 11, 1963

3,093,353
AIRCRAFT OCCUPANT PROTECTING AND EJECTING SYSTEM

Frank T. Pisano, 182 W. Albanus St., Philadelphia, Pa., and Leonard L. Pitney, 38 Thornyapple Lane, Levittown, Pa.

Filed Jan. 28, 1963, Ser. No. 254,512
3 Claims. (Cl. 244—122)
(Granted under Title 35, U.S. Code (1952), sec. 266)

The invention described herein may be manufactured and used by or for the Government for governmental purposes without the payment to us of any royalty thereon.

This invention relates to systems or mechanism for protecting an aircraft occupant from injury as the result of excessively rapid changes in the movement of the aircraft and for ejecting the occupant from his seat after it has been ejected from the aircraft.

Obviously the occupant of an aircraft may be thrown from his seat and injured by excessively rapid change in aircraft's motion. Such injury has been heretofore minimized or prevented by means of a belt attached at one end to the occupant's shoulder harness and at the other end to a reel at the back of his seat. This reel is sometimes called an "inertial reel" and includes a centrifugal device which functions to arrest movement of the occupant's shoulders when they attain a predetermined acceleration. Such reels are available in various forms and are generally energized by a ballistic motor. One suitable for use in the present invention is described in certain pamphlets entitled "Spool Type Shoulder Harness Reel" and published by the Pacific Scientific Co. of Los Angeles, California.

After an aircraft occupant and his seat have been ejected from the aircraft, the occupant has been ejected from the seat by means of a belt attached at one end to the front of the seat and at the other end to a reel mounted to the rear of the seat. This reel is sometimes called an "ejector reel" and, like the inertial reel, is usually energized by a ballistic motor. The belt to which it is attached extends over the bottom and up the back of the seat. When it is tightened by the reel, it throws the occupant from the seat.

The present invention provides a modified arrangement or system wherein a single reel functions during normal operation to limit the acceleration of the occupant's shoulders and during an emergency to position the occupant in an erect sitting position prior to the ejection of the seat from the aircraft and to eject the occupant from the seat after it is free of the aircraft.

This double use of the single reel has the important advantage that it effects a substantial reduction in the required space, the overall weight, the number of mechanical parts, the cost of maintenance, and the number of spare parts required to be kept available for replacement.

The invention will be better understood from the following description when considered in connection with the accompanying drawings and its scope is indicated by the appended claims.

Referring to the drawings.

Figure 1:
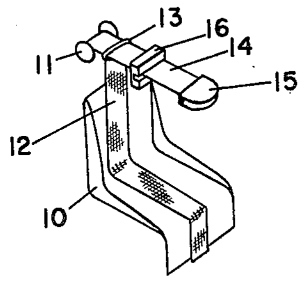
FIGS. 1 to 3 are views illustrating successive steps in the operation of the mechanism.
Figure 2:
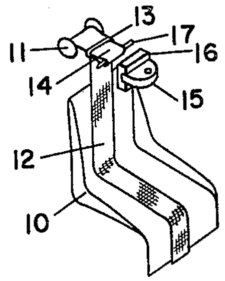
Figure 3:
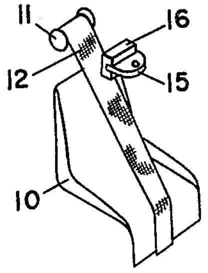

FIGS. 1 to 3 show a seat 10 to the rear of which is mounted a reel 11. Extending from the front of the seat 10, across the bottom and up the back thereof to a loop or ring 13 is an ejector belt 12. An inertial belt 14 extends from a harness attachment 15 through a release mechanism 16, and the ring 13 to the reel 11. As is well known to those skilled in he art, the reel 11 is so designed that it (1) permits free movement of the harness attachment 16 so long as its acceleration is below a predetermined value (2) arrests this harness attachment when its acceleration exceeds this predetermined value, and (3) is energized by a ballistic motor to force the aircraft occupant to an erect sitting position when he and the seat are to be ejected from the aircraft. The present invention assigns to the reel 11 the additional function of tightening he ejector belt 12 after the man and seat are free from the aircraft.

This may be accomplished in various ways. In the modification illustrated by FIGS. 1 to 3, it is effected by means of the release mechanism 16. When the occupant is forced to an erect sitting position, the harness attachment 15 is disengaged from the belt 14 by the release mechanism 16, a pin 17 in the end of the belt 17 engages the ring 13 and the belt 12 is wound onto the reel 11 over the belt 14. FIG. 2 illustrates the situation immediately following the separation of the belt 14 from the harness attachment 15 and FIG. 3 indicates the situation subsequent to the ejection of the occupant from the seat.

Figure 4:
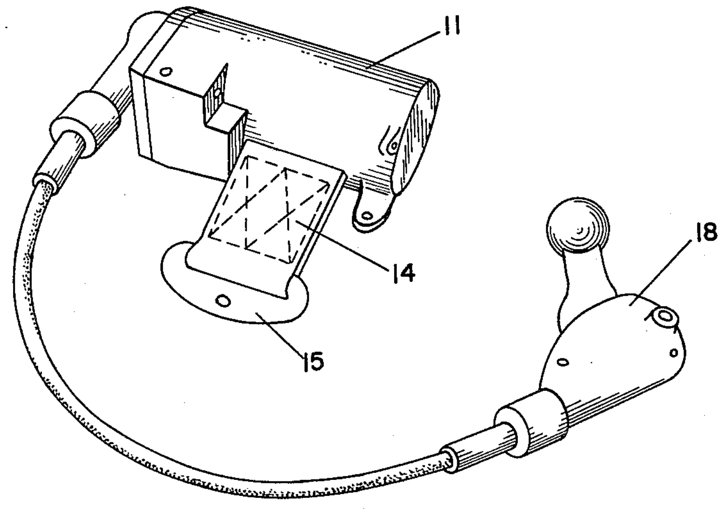
FIG. 4 is an exterior view of the reel which controls the movements of the inertial and ejector belts.
Figures 5, 6, 7:
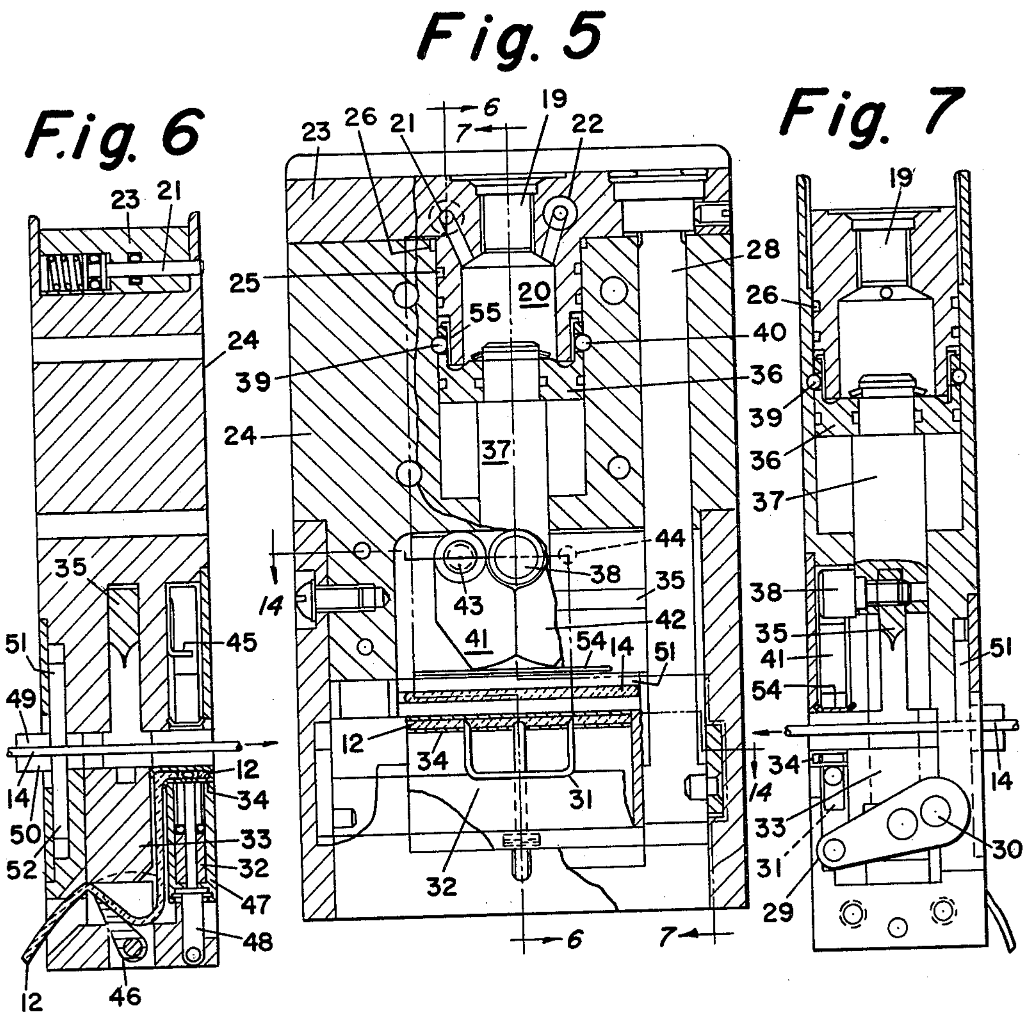
FIG. 5 illustrates various details of a device which is operable successively to staple together the inertial and ejector belts and to cut the inertial belt loose from the harness of the aircraft occupant.
FIG. 6 is a section taken on the line 6—6 of FIG. 5.
FIG. 7 is a section taken on the line 7—7 of FIG. 5.
Figure 8:
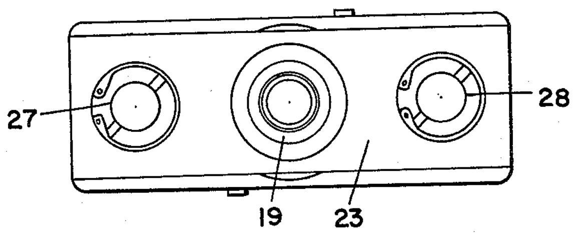
FIG. 8 is a top view of the belt stapling and cutting device.
Figure 9:
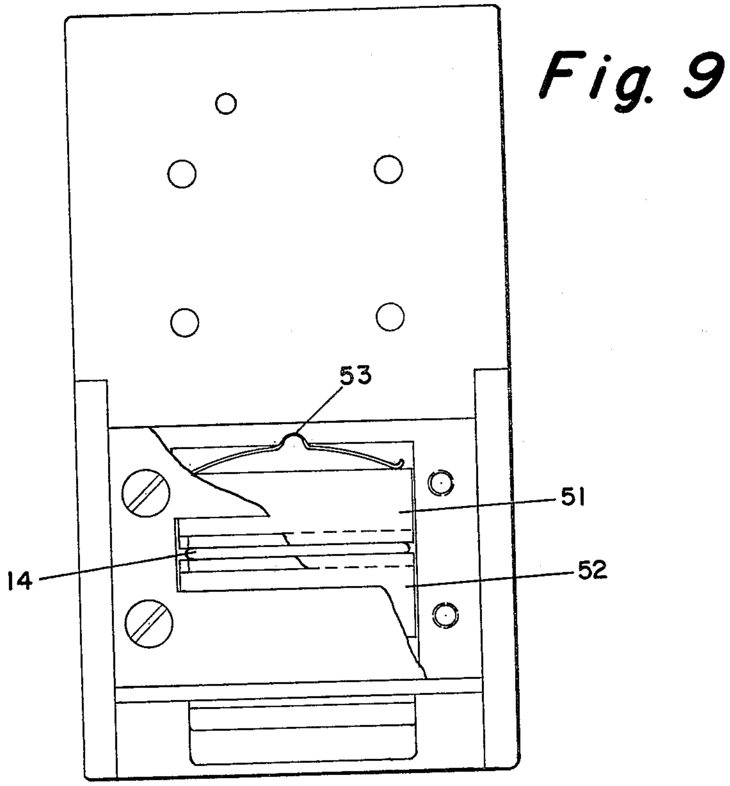
FIG. 9 illustrates means for holding the inertial belt prior to the belt stapling and cutting operation.
Figure 14:
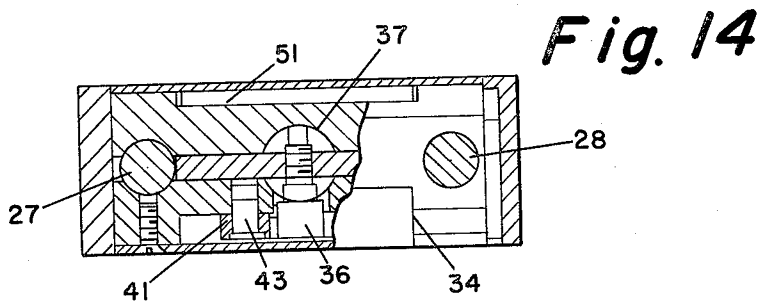
FIG. 14 is a section taken on the line 14—14 of FIG. 5.
Figure 10:
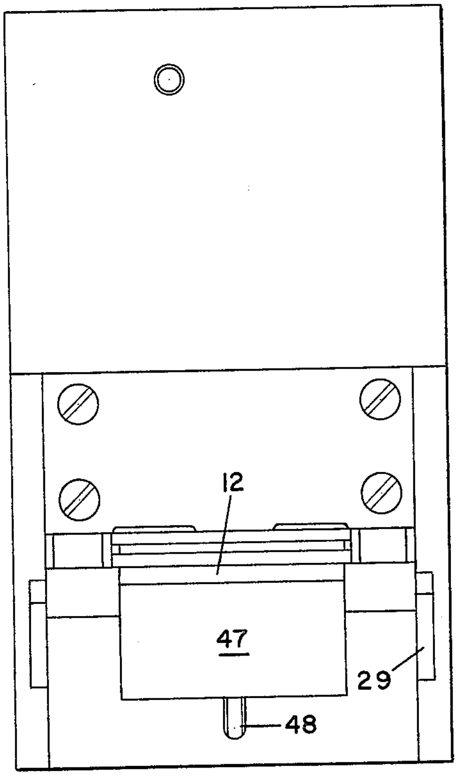
FIGS. 10 to 12 are partial sectional views of the device.
Figure 11:
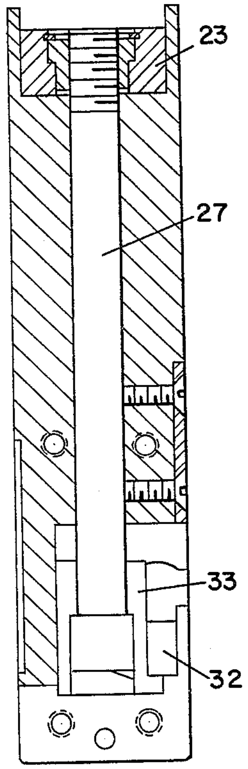
Figure 12:
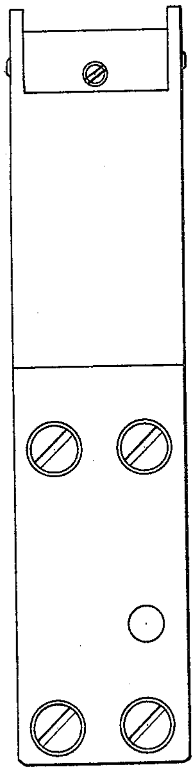
Figure 13:
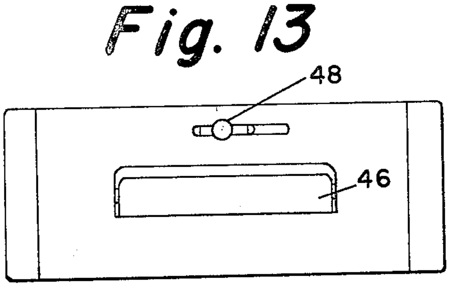
FIG. 13 is a bottom view of the device.

FIG. 4 shows the exterior of the reel 11. Associated with it is a control device 18 which is manually operated to release the belt 14 after it has been locked by a too rapid acceleration of the harness 18.

The release mechanism 16 of FIGS. 1 to 3 may assume various forms. One suitable embodiment of it is the mechanism of FIGS. 5 to 14. This mechanism is energized by a gas pressure and functions in quick succession to staple the belt 12 to the belt 14 and to cut the belt 14 loose from the harness 15.

Gas pressure is introduced through a port 19 (FIG. 5) into a chamber 20 where it actuates pins 21 and 22 to release a member 23 from a member 24. Thereupon, the member 23 is moved upwardly by the gas pressure until it comes to rest with a compressed ring 25 in a groove 26.

This upward movement of the member 23 functions through the rods 27 and 28 to rotate links 29 about a pivot 30. As the links 29 rotate, a staple 31, supported on a cross piece 32, is actuated to pierce the belts 12 and 14 and reinforcing plates 34 and 54. At the same time an anvil 33 is moved into contact with the belt 14. The link 29 provides an approximately 3 to 1 travel distance between the cross piece 32 and the anvil 33 to compensate for the length of the staple 31.

A cutter 35 is supported through a piston 36, a connecting rod 37 and a knob 38. The piston 36 remains locked under pressure while the member 23 strokes out. When the member 23 reaches the end of its travel, balls 39 and 40 previously maintained in position by a spring 55, drop out and the piston 36 is released and moved downwardly by the gas pressure in chamber 20. As the piston 36 moves, the knob 38 forces apart two members 41 and 42 which are spring biased to their illustrated positions by springs 45 and are pivoted at points 43 and 44. As the members 41 and 42 move apart they clinch the ends of the staple 31 thereby firmly securing together the belts 12 and 14 and the reenforcing plates 34 and 54. Movement of the piston 36 is terminated when the cutter 35 has severed the belt 14 and engages the anvil 33.

A pivoted lock member 46 is provided to assure that slack is provided for the travel of the belt 12. Upward travel of the anvil 33 releases the lock 46 to swing in the direction of the belt's travel.

A part 47 supports belt 12 and travels upwardly with the anvil 33 when the mechanism is actuated. A member 48 functions as a jack post for a snap-on connection in the belt 12 and is free to swing outwardly with the members 32 and 47 at the end of their upward travel.

Stops 49 and 50 are fixed to the belt 14 and engage movable stops 51 and 52 at the required eighteen inch reel-in of the shoulder harness strap 14. Springs 53 (FIG. 9) maintain the movable stops 51 and 52 engaged with the belt 14. The power load is held by the stops 51 and 52 until the belt 14 is cut.

Considering the overall operation of the protecting and ejecting system it can be seen that the inertial reel 11 functions in a well known manner to permit free movement of the occupant's shoulders under normal conditions, to lock his shoulders against forward movement when they attain a predetermined acceleration, and to move his shoulders to an erect sitting position in the case of an emergency and before he and the seat are ejected from the aircraft.

The inertial belt 14 is disconnected from the harness attachment 15 and attached to the upper end of the ejector belt 12 after the seat and occupant are out of the aircraft and the belt 12 is wound on to the reel 11 over the belt 14. The preferred means of accomplishing is the stapling and cutting device illustrated by FIGS. 5 to 13.

Operation of this device is initiated by introducing a gas under pressure through a port 19 into the chamber 20. This actuates the pins 21 and 22 to unlock the member 23 from the member 24. Thereupon the member 23 travels upward until the ring 25 slips into the groove 36. During this upward travel, the member 23 operates through the rods 27 and 28 and links 29 to force the staple 31 through the belts 12 and 14 and to bring the anvil 33 up against the belt 14 which is to be cut free from the harness attachment 15 (FIGS. 1 to 3).

When the member 23 reaches the end of its upward travel, the balls 39 drop out releasing the piston 36. Thereupon, the piston is forced downward by the gas pressure, the knob spreads the members 41 and 42 apart to clinch the ends of the staple, the cutter severs the harness attachment from the belt 14, the members 32, 47 and 48 swing away from their upright position and the belt 12 is wound into the reel 11.

We claim:

1. In a system for maintaining the acceleration of an aircraft occupant's shoulders below a predetermined limit and for ejecting said occupant and his seat from said aircraft in case of an emergency, the combination therewith of a shoulder harness attachment, an internal reel mounted at the top and to the rear of said seat, an inertial belt fixed at one end to said harness attachment and arranged at its other end to be rolled about said reel, an injector belt having one of its ends fixed to the front of said seat and having its other end position adjacent said inertial belt, said ejector belt extending over the bottom of said seat and up the back thereof, and means for successively attaching said other end of said ejector belt to said inertial belt and detaching said inertial belt from said shoulder harness.

2. In a system for maintaining the acceleration of an aircraft occupant's shoulders below a predetermined limit and for ejecting said occupant and his seat from said aircraft in case of an emergency, the combination therewith of a shoulder harness attachment, an inertial reel mounted at the top and to the rear of said seat, an inertial belt fixed at one end to said harness attachment and arranged at its other end to be rolled about said reel, an ejector belt having one of its ends fixed to the front of said seat and having its other end positioned adjacent said inertial belt, said ejector belt extending over the bottom of said seat and up the back thereof, and a mechanism including a first member movable by a gas pressure to join said other end of said ejector belt to said inertial belt, and a second member movable by said gas pressure at the end of said first member's movement to disconnect said inertial reel from said shoulder harness.

3. In a system for maintaining the acceleration of an aircraft occupant's shoulders below a predetermined limit and for ejecting said occupant and his seat from said aircraft in case of an emergency, the combination therewith of a shoulder harness attachment, an inertial reel mounted at the top and to the rear of said seat, an inertial belt fixed at one end to said harness attachment and arranged at its other end to be rolled about said reel, an ejector belt having one of its ends fixed to the front of said seat and having its other end positioned adjacent said inertial belt, said ejector belt extending over the bottom of said seat and up the back thereof, and a mechanism including an anvil, a member supporting a staple, a first member movable by a gas pressure to force said staple through said inertial belt and said other end of said ejector belt and to move said anvil against said inertial belt at a point between said staple and said harness, a cutter, means for clinching the ends of said staple, and a second member movable by said gas pressure at the end of said first member's movement to actuate said clinching means and to force said cutter through said inertial belt against said anvil.

References Cited in the file of this patent

UNITED STATES PATENTS

| | | |
|---|---|---|
| 3,027,126 | Wallace | Mar. 27, 1962 |
| 3,077,324 | Strickland | Feb. 12, 1963 |